B. A. ALPERIN.
AUTOMOBILE.
APPLICATION FILED MAR. 13, 1908.
936,595.
Patented Oct. 12, 1909.
3 SHEETS—SHEET 3.
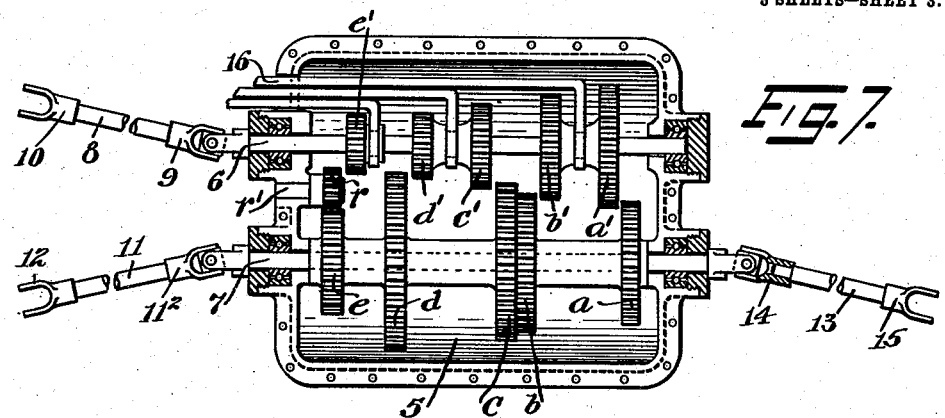
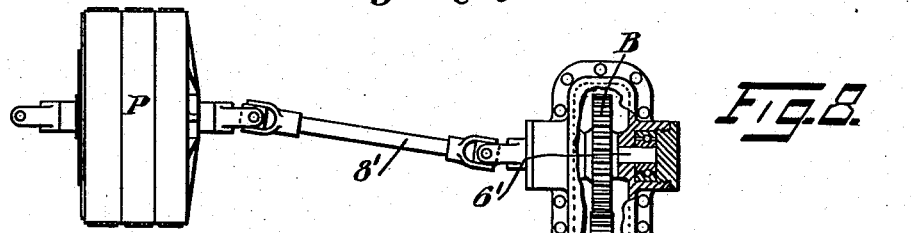
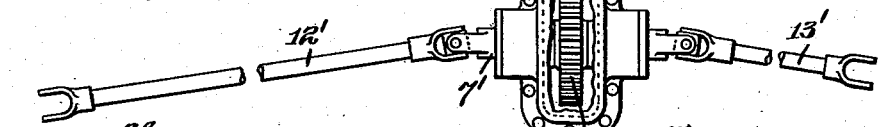
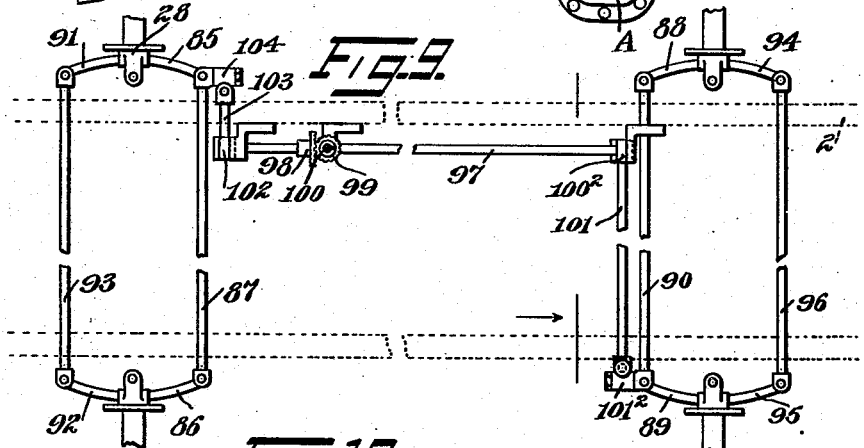
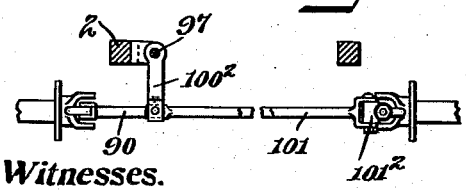
Witnesses.
Inventor,
Bernard A. Alperin,
By his Attorney,

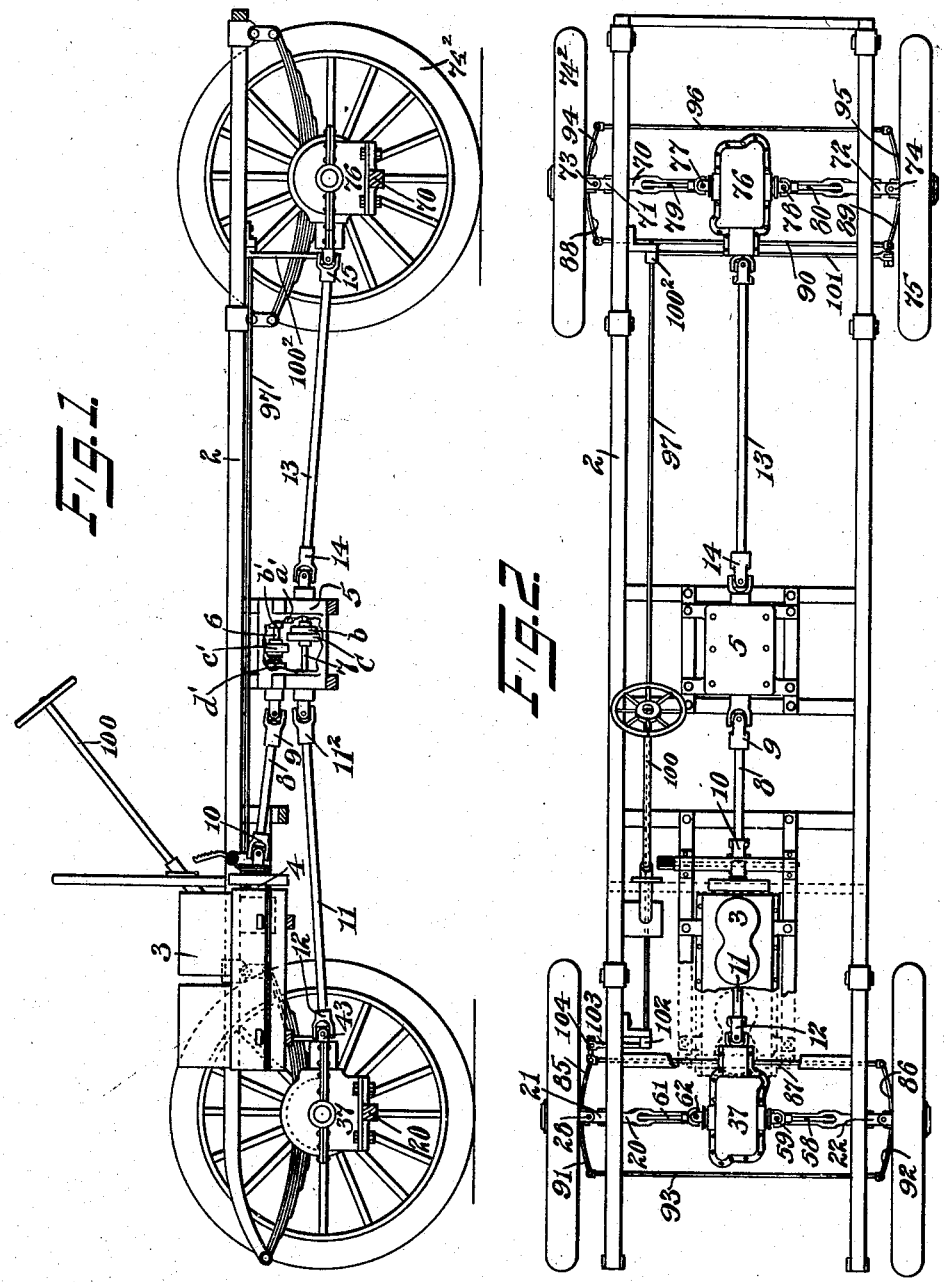

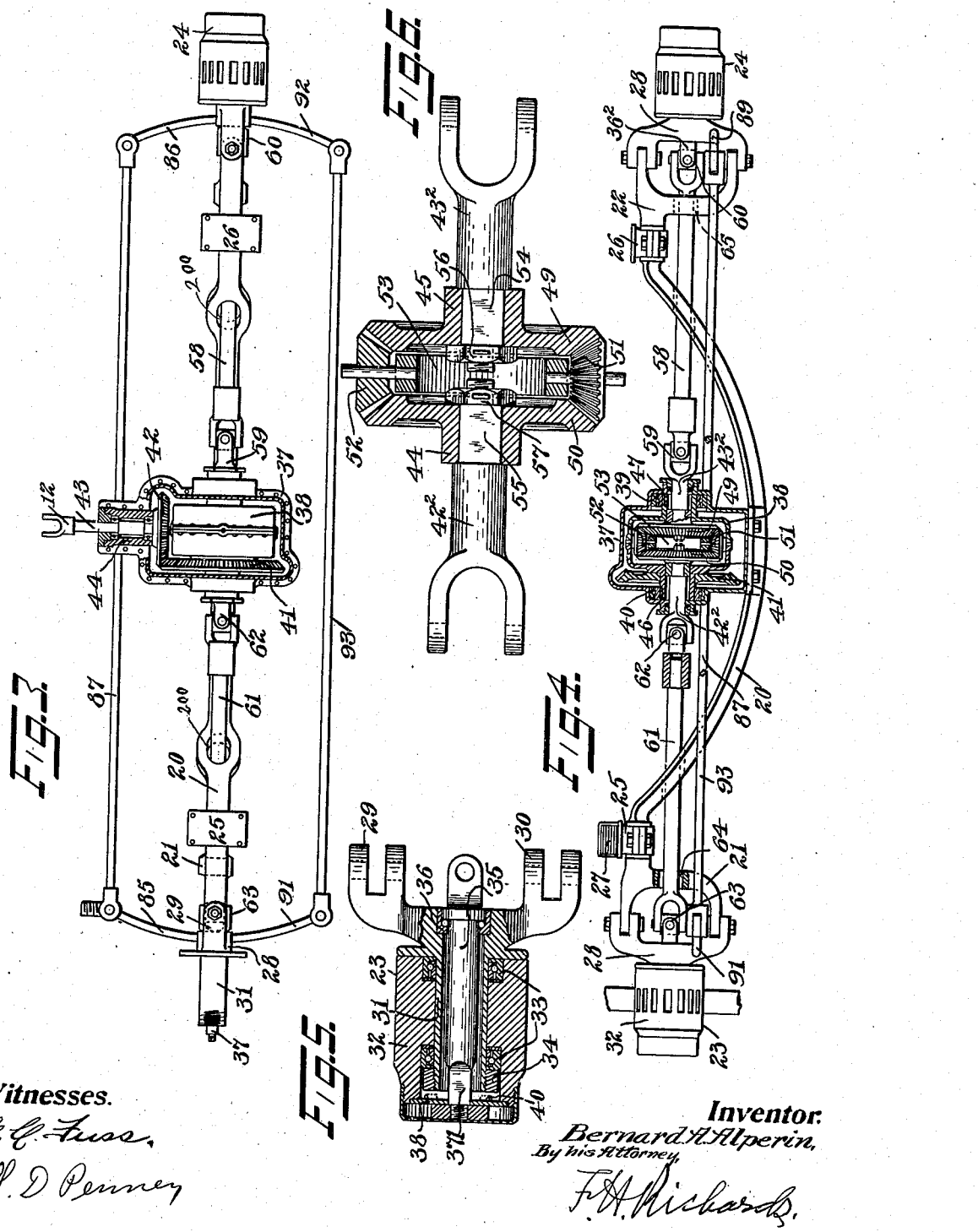

UNITED STATES PATENT OFFICE.

BERNARD A. ALPERIN, OF NEW YORK, N. Y.

AUTOMOBILE.

936,595.  Specification of Letters Patent.  Patented Oct. 12, 1909.

Application filed March 13, 1908. Serial No. 420,760.

*To all whom it may concern:*

Be it known that I, BERNARD A. ALPERIN, a citizen of the United States, residing in New York city, in the county of New York and State of New York, have invented certain new and useful Improvements in Automobiles, of which the following is a specification.

This invention relates especially to the running gear of motor vehicles; and has for its object to provide an improved construction in the type of such vehicles in which the power is transmitted from a motor to all of the four driving wheels.

In the accompanying drawings representing embodiments of my invention, Figure 1 shows the chassis of a motor vehicle in side elevation. Fig. 2 is a plan view of the same. Fig. 3 is a detail view in plan, partly in section showing one of the axles and connected parts. Fig. 4 is an elevation of the parts shown in Fig. 3 being shown partly in section. Fig. 5 is a vertical section, partly in elevation of a hub and its knuckle joint. Fig. 6 is a sectional view, partly in elevation, of the inner part of the differential. Fig. 7 shows in vertical section, partly in elevation one form of transmission with the connected shafts. Fig. 8 is a similar view showing a planetary transmission. Fig. 9 is a fragmentary view showing in plan parts of the steering mechanism. Fig. 10 also shows a detail of the steering mechanism. Fig. 11 shows the lock plate for the hub of the wheel.

The chassis is shown as comprising a frame member 2 supporting a motor denoted generally by 3, that may be of the usual vertical cylinder such as steam engine or electric motor type; or any other desired form; the driving shaft 4 of the motor at the rear end being connected with the various transmission members, so as to drive both the front and rear wheels. A gear member is provided comprising two short shafts, one of the shafts being connected with the engine shaft by an intermediate shaft having universal joints at each end. The second said shaft driven from the first shaft preferably by gearing, is connected with a differential driving member on the front and also the rear axle members and in each of said connections there is included a shaft having a universal joint connection at each end. I preferably arrange this said gear connection below the line of the engine shaft, yet above the line of the axle, and preferably about mid-way between such levels, whereby the connecting shaft from the engine shaft is inclined downward at a slight angle, and the two other said connecting shafts from this gear member inclined slightly downward and at a similar angle, to the differential members on the two axle members.

Where the motor is of the explosive type, it is necessary to provide means for disconnecting the engine and also to provide several different speeds. In Figs. 1, 2 and 7 a selective sliding gear form of transmission is shown, while in Fig. 8 a planetary transmission is illustrated, it being understood that either may be employed according to uses of the car; the planetary being preferable for commercial cars and the selective gears being more adapted to pleasure vehicles or those for high speed purposes.

In Figs. 1 and 7 is shown a gear box 5 in which are mounted two shafts 6 and 7. A shaft 8 connects the engine shaft 4 with the transmission shaft 6, and has universal joints 9 and 10 at its ends. A slip joint may be provided between one of the universal joint members and the shaft to permit endwise movement. A connecting shaft 11 runs from one end of the driven gear shaft 7 to the front differential member, and is provided with universal joints $11^2$ and 12 at its ends, one of which is preferably a slip joint providing endwise movement. A similar shaft 13 connects with the other end of the gear shaft 7 by universal joint 14 while its other end connects by a universal joint 15 with the differential member on the rear axle. In the usual form of gear transmission, the driving and the driven shaft are constantly in mesh being connected by gears, but in the form illustrated the shafts are not always connected, but fixed gears on the driven shaft are engaged successively by sliding gear members splined on the driving shaft whereby different speeds can be obtained forward, and also a reverse can be connected. The gear shaft 7 is shown as provided with gears $a$, $b$, $c$, $d$ and $e$ that are fast on the shaft. A pair of connected gears $a'$, $b'$, are slidable on the shaft 6 but connected to rotate therewith. When this gear member is moved endwise by suitable connecting bar 16, it will cause gear $a'$ to mesh with gear $a$, while if moved in the opposite direction it will engage gears $b$ and $b'$ and give two different speeds. In a similar way the gear member having gears $c'$ and $d'$ can mesh alternately with the gears $c$ and $d$ giving the lower speeds. A gear $r$ mounted on a suitable stub shaft $r'$ meshes with the gear $e$; and a sliding gear $e'$ on the shaft 6 is slidable into engagement with the gear $r$ giving the reverse. By this means the driven shaft 7 can be operated at four different speeds from the shaft 6, or can be moved in the reverse direction.

Where it is desired to use a planetary transmission, the arrangement can be as shown in Fig. 8 in which a planetary transmission P is connected directly with the driving shaft 4. A gear arrangement is shown in which there are two shafts $6'$ and $7'$ continuously connected by gears A and B. An inclined shaft $8'$ connects the planetary gear system with the shaft $6'$ and in the same manner as the shaft 8, using universal joints. And inclined shafts $12'$ and $13'$ connect with the driven shaft $7'$ similarly to the described shafts 11 and 13 using universal joint connections and slip joints. If an electric motor or a steam engine were used and no transmission was necessary, the planetary transmission P could be omitted and the shaft $8'$ connected directly with the engine shaft 4, as is the shaft 8 in Fig. 7. If desired to use a more direct drive in connection with an electric motor, the motor could be placed in the gear box member 5, the shaft of the motor corresponding with the shaft 7, connecting at its ends with the respective shafts 11 and 13 by the joints 14 and $11^2$. In such case the shaft 6 of the gear box would be omitted and the connecting shaft 8; and in place of the motor 3 the storage batteries could be substituted.

The shafts running to each axle member connect with the live axle thereof running to each of the wheels, and in this arrangement the four wheels are used for driving as well as for steering. The connection of these shafts is preferably through a differential to provide for the usual different speeds of the two wheels driving to facilitate the turning. Preferably the front and rear driving mechanisms are substantially identical and a description of one will answer for both. Referring particularly to Figs. 3–6 the axle member comprises the axle proper that is denoted by 20 and is shown in the form of an inverted arch, at each end having a yoke member 21 and 22 forming a part of the knuckle joint of the wheels 23 and 24. The spring seats are arranged at each end of the curved portion 20 and preferably consist of pivoted boxes 25 and 26 to which the springs 27 are clamped, which arrangement will permit a slight swinging or turning movement. Each of the wheel members is shown as having a yoke portion 28 connected with the hub that is pivoted to the yoke member 21 of the axle, on an axis that is preferably vertical. In the construction illustrated each end of the yoke 28 is forked as shown at 29 and 30, into which project the apertured ends of the yoke member 21 at each wheel. Yoke 28 has a sleeve extension 31, on which the hub 32 rotates preferably having ball or roller bearings thereon as shown at 33. The wheel is rotatably secured on the sleeve 31 by means of one or more nuts 34 screwed onto the threaded end of the sleeve. A spindle 35 projects into the sleeve 31 and through the yoke 28, and may have a ball bearing 36 adjacent the yoke. At its other end this spindle is secured to the hub to cause rotation of the wheel. In the construction illustrated the spindle has a square end $37^1$ on which is slipped a lock plate 38 having a rectangular opening 39 to engage the square end of the spindle. This lock plate 38 is in the nature of a clutch member having teeth 40 that enter corresponding sockets or recesses in the outer end of the hub 32. By this means a rotation of the spindle 35 will cause the rotation of the wheel. But should the clutch plate become loosened the wheel could not come off of the journal member 31 by reason of the lock nuts 34 holding it securely in position. At the other end of the axle the wheel-hub 24 is connected with the yoke member 22 in the same manner and the hub is carried on ball bearings on the yoke sleeve by similar construction and spindle $36^2$ similar to the spindle 35 is rigidly connected with the hub to drive the wheel. At the middle of the axle member is shown a differential device connected with one of the universal driving shafts as for instance the shaft 11. This comprises a housing 37 carried at the middle of the axle member 20. In this housing is a frame 38 rotatable in ball bearings 39 and 40 in the housing. This frame member has a bevel gear 41 secured thereto that meshes with a bevel gear 42 on the end of a shaft 43 mounted in bearings 44 in the housing. The shaft 43 has the universal joint connection 12 with the shaft 11. The frame 38 contains the differential member that is shown separately in Fig. 6 comprising two stub shafts $42^2$ and $43^2$ rotatable in the frame. Bevel gears 49 and 50 are attached to these stub shafts or a part thereof their hubs 44 and 45, having bearings 46 and 47 in the housing 38, and these bevel gears mesh with the planetary gears 51 and 52 that are pivotally carried by the frame 38 and mounted radially therein in the usual manner of differential gearing; the pinions of the gears being carried by ring member 53. The stub shafts $42^2$ and $43^2$ may have squared ends 54 and 55 fitting into the squared sockets of the gears 49 and 50, and the opposite ends of the shafts are threaded and are locked to the gears by nuts 56 and 57. The stub shaft $43^2$ connects with an axial shaft 58 by universal joint 59; while the end of shaft 58 connects with the spindle $36^2$ by universal joint 60, by which means the hub 24 is driven. On the opposite side a shaft 61 connects by universal joint 62 with the stub shaft $42^2$; while the other end of shaft 61 connects by universal joint 63 with the spindle 35. By this arrangement both of the hubs 23 and 24 are connected with the longitudinal driving shaft 11 and driven therefrom through a differential connection; so that when the wheels are swung on the knuckle joints for steering, the universal joints 63 and 60 being in alinement with the axis of the knuckle joints will still drive the wheels through the differential that will permit of different speeds for the wheels for turning in the usual manner. It will be observed that the yokes 21 and 22 have openings 64 and 65 through which the shafts 58 and 61 freely pass which arrangement will permit of lateral movement of these shafts. The inverted arch axle 20 is provided with apertures 200 that aline with the apertures 64 and 65 in the yoke members 21 and 22, through which apertures project the live axle portions 58 and 61, as shown in Fig. 4. These two shafts have a slip joint at their universal connections 59 and 62 to permit endwise movement.

At the rear end of the vehicle a substantially identical arrangement is used in which there is a main axle 70 having yoke members 71 and 72 at its ends pivoted to yokes 73 and 74 constituting knuckle joints for the wheels $74^2$ and 75. A differential mechanism 76 identical with that just described is employed and connects with the shaft 13 by the universal joint 15. The differential bevel gears connect by universal joints 77 and 78 with shafts 79 and 80 respectively; and these latter connect with the wheels $74^2$ and 75. By this construction the rear wheels are also positively driven from the transmission or driving mechanism, and at the same time permit of the swinging or steering of the vehicle at this end also, the universal joints being in alinement with the axis of the knuckle as at the front. Consequently we have an arrangement by which the vehicle is driven by all four of its wheels and through differential mechanism, permitting different relative speeds of each pair of wheels, and each of the wheels is constructed to swing for steering purposes, yet acts as a driving wheel in all positions.

Means are also provided by which the wheels can be swung simultaneously for steering the vehicle from a single steering member such as a steering post. The front yoke or knuckle members of the wheels have arms 85 and 86 connected by a bar 87. The rear yokes have arms 88 and 89 connected by a bar 90. These members may also have arms 91 and 92 connected by a bar 93 at the front, and arms 94 and 95 connected by bar 96 at the rear for strengthening purposes. A longitudinal shaft 97 carries a sector 98 meshing with a gear 99 on a steering post 100 by which this shaft is turned. At the rear, this shaft carries an arm $100^2$ (see Fig. 10) pivoted to a bar 101 at one end while the other end of the bar connects at $101^2$ by universal joint with the arm 89. At the other end of the shaft an arm 102 connects by a link 103 through universal joint 104 with the arm 85. By the turning of the shaft by the steering post, these steering connections will swing the arms rigidly connected with the knuckle joints and simultaneously swing the four wheels. It will be observed that the connecting bar 101 leads in one direction from the shaft while the connecting bar 103 leads in the opposite direction. This will result in the wheels on the same side of the vehicle swinging in opposite directions on their pivots, which is the proper operation to correctly steer the vehicle and which will effectually prevent the skidding action, and permit very short turning of the vehicle. The extra bars are not necessary for such operation, but add greatly to the strength of the steering connection and resist bending or twisting of the members.

Having thus described my invention, I claim:

In a motor vehicle, the combination of a pair of wheel members each carrying a yoke, a pair of yoke members each pivotally connected with said wheel yoke members to swing on a substantially vertical axis, said latter yoke members having at the top a lateral projection extending inwardly and carrying a spring seat, a main axle of inverted-arch shape secured at its extremities to said yoke projections, each of the axle yoke members having an aperture at its middle portion, said main axle having an aperture therein at each end portion in alinement with said apertures in the yokes, a live axle passing through said four apertures, and being connected with the wheel members by universal joints in alinement with the pivotal yoke connections, a differential member carried by the inverted-arch axle at its middle portion, and universal joints connecting the differential member with the live axle portions, said live axle portions having free movement in the said apertures in the inverted axle and in the yokes.

BERNARD A. ALPERIN.

Witnesses:
 FRED. J. DOLE,
 HENRY E. GREENWOOD.